United States Patent [19]

Schröder

[11] Patent Number: 5,033,041
[45] Date of Patent: Jul. 16, 1991

[54] A TRACKING CIRCUIT FOR RETURNING AN OPTICAL BEAM TO A TRACK BEING SCANNED ON A COMPACT DISK AFTER BEING JARRED AWAY

[75] Inventor: Heinz-Jörg Schröder, Villingen-Schwenningen, Fed. Rep. of Germany

[73] Assignee: Deutsche Thomson-Brandt GmbH, Villingen-Schwenningen, Fed. Rep. of Germany

[21] Appl. No.: 250,780

[22] Filed: Sep. 28, 1988

[30] Foreign Application Priority Data

Sep. 30, 1987 [DE] Fed. Rep. of Germany ....... 3732899

[51] Int. Cl.$^5$ ............................................... G11B 7/00
[52] U.S. Cl. ............................ 369/44.32; 369/44.28
[58] Field of Search ............... 369/44, 45, 46, 44.32, 369/44.35, 44.28, 32; 250/202

[56] References Cited

U.S. PATENT DOCUMENTS

| | | | |
|---|---|---|---|
| 4,365,324 | 12/1982 | Michaelis | 369/44 |
| 4,476,555 | 10/1984 | Joichi et al. | 369/44 |
| 4,805,163 | 2/1989 | Ohnuki | 250/202 |

Primary Examiner—Donald McElheny, Jr.
Attorney, Agent, or Firm—Max Fogiel

[57] ABSTRACT

A tracking circuit for an optical scanner to return a light beam to a data storage track of a disk that was scanned by the light beam, after the light beam was deflected away as a result of an outside random shock or vibration. A difference amplifier generates a tracking error by taking the difference between two photovoltages. A directional logic circuit in the form of a D flip-flop determines which direction the light beam was deflected away from the data storage track that was scanned by the light beam. The light beam may skip storage tracks when it is deflected away from the track that was being scanned. The number of storage tracks that were skipped by the light beam, in this manner, are counted by an up-and-down counter, and this counter emits a control signal which is dependent on the state of the counter for deflecting the light beam back to the data storage track that was scanned. The counter output is applied to a control amplifier through a pulse shaper. The output of the difference amplifier in the form of the tracking error is applied to the control amplifier through a controllable switch that has a control input from the counter.

5 Claims, 3 Drawing Sheets $HF = AS + BS + CS + DS$
$FE = (AS + CS) - (BS + DS) = 0$
$TE = ES - FS = 0$ $FE = (AS + CS) - (BS + DS) < 0$
$TE = ES - FS = 0$ $FE = (AS + CS) - (BS + DS) > 0$
$TE = ES - FS = 0$ $FE = (AS + CS) - (BS + DS) = 0$
$TE = ES - FS < 0$ $FE = (AS + CS) - (BS + DS) = 0$
$TE = ES - FS > 0$

A TRACKING CIRCUIT FOR RETURNING AN OPTICAL BEAM TO A TRACK BEING SCANNED ON A COMPACT DISK AFTER BEING JARRED AWAY

BACKGROUND OF THE INVENTION

The invention concerns a tracking circuit for an optical pick-up wherein the tracking error TE is obtained from the difference between two photovoltages.

The design and function of an optical pick-up are described in Electronic Components and Applications 6 (1984), 4, 209-15.

The beam of light emitted from the laser diode is focused on the compact disk by means of lenses and reflected onto a photodetector. The data stored on the disk and the actual values for the focusing and tracking circuits are obtained from the signal leaving the photodetector. The aforecited reference calls the actual value for the focusing circuit the "focusing error" and the actual value for the tracking circuit the "radial tracking error."

The positioning mechanism in the focusing circuit is a coil with an objective lens traveling along its optical axis. The focusing circuit displaces the objective lens in such a way that the beam of light emitted from the laser diode is always focused on the compact disk. The tracking circuit, which is often called a "radial drive mechanism," displaces the optical pick-up radially in relation to the compact disk. This measure makes it possible to guide the beam of light along the spiral data-storage tracks on the disk.

The radial drive mechanism in some equipment comprises what are called a coarse drive mechanism and a fine drive mechanism. The coarse drive mechanism is for example a spindle that radially displaces the overall optical pick-up comprising the laser diode, the lenses, the prism beam divider, and the photodetector. The fine drive mechanism tilts the beam of light radially at a slight prescribed angle, an action that in itself displaces the beam slightly along the radius of the disk.

The unobjectionable playback of the data—whether video and audio in a videodisk player or audio alone in a compact-disk player—requires not only that the beam of light be precisely focused on the videodisk or compact disk but also that it be precisely guided along the data-storage tracks.

FIGS. 1a-1e illustrate the photodetector PD in the optical pick-up of a compact-disk player wherein three laser beams L1, L2, and L3 are focused on a compact disk. Laser beams L1 and L2 are refraction beams of the $+1$st and $-1$st order. A pick-up of this type is called a "three-beam pick-up" in the aforecited reference.

The photodetector PD comprises four adjacent square photodiodes A, B, C, and D in the form of a larger square. Diagonally opposite the larger square consisting of the four photodiodes are two other square photodiodes E and F.

Central laser beam L1, which is focused on photodiodes A, B, C, and D, generates a data signal $HF = AS + BS + CS + DS$ and a focusing error $FE = (AS + CS) - (BS + DS)$. The two outer beams of light L2 and L3, the farther forward of which, L2, strikes photodiode E and the farther to the rear of which, L3, strikes photodiode F, generate a tracking error $TE = ES - FS$. AS, BS, CS, DS, ES, and FS represent the photovoltages of the photodiodes A, B, C, D, E, and F. Since there is an astigmatically active collimator lens in the path of the central laser beam L1 in the optical pick-up, the beam will strike the large square comprising photodiodes A, B, C, and D in the shape of a circle when it is precisely focused and in the shape of an ellipse when it is out of focus.

FIG. 1a illustrates the situation in which both focusing and tracking are precise. This situation will be discussed later herein. Since the spot of light projected onto the large square by central laser beam L1 is circular, focusing error $FE = (AS + CS) - (BS + DS) = 0$. The zero indicates to the focusing circuit that the focus is precise.

FIG. 1b illustrates the out-of-focus situation in which the objective lens is too far from the compact disk. Focusing error $FE = (AS + CS) - (BS + DS) < 0$. The negative value indicates to the focusing circuit that the objective lens is too far away from the disk. The positioning mechanism in the focusing circuit accordingly displaces the lens toward the disk until focusing error FE becomes zero.

FIG. 1c illustrates the other out-of-focus situation in which the objective lens is too near the compact disk. Focusing error $FE = (AS + CS) - (BS + DS) > 0$. The positive value indicates to the focusing circuit that the objective lens is too near the disk. The positioning mechanism in the focusing circuit accordingly displaces the lens away from the disk until focusing error FE becomes zero.

How the tracking circuit carries out the tracking will now be described.

The laser beams L1, L2, and L3 in FIGS. 1a, 1b, and 1c are precisely on track. Tracking error $TE = ES - FS = 0$.

FIG. 1d illustrates the situation in which laser beams L1, L2, and L3 are to the right of the track. The tracking error becomes negative: $TE = ES - FS < 0$. The positioning mechanism in the tracking circuit displaces the optical pick-up to the left until the tracking error becomes zero.

In the opposite situation, in which the laser beams are to the left of the track, the tracking error is positive: $TE = ES - FS > 0$. The positioning mechanism in the tracking circuit displaces the optical pick-up to the right until the tracking error becomes zero.

When laser beam L1 and its associated refraction beams L2 and L3 travel over several data-storage tracks, tracking error TE assumes the sinusoidal characteristic illustrated in FIG. 2. If for example the three laser beams L1, L2, and L3 are jolted away from the data-storage track being scanned by a mechanical vibration, they can only be shifted back to the correct data-storage track when the track deviation is no greater than 0.8 $\mu$m, half the distance between two adjacent data-storage tracks. Otherwise, the laser beams will engage the adjacent track.

Since it is possible to employ the subcode in a compact disk to determine whether the beam has skipped over to an adjacent track, laser beam L1 can be deflected back onto the correct data-storage track. Since the information signal for at least one block unit or even for a complete revolution is interrupted during deviations of this type, which are caused by mechanical vibrations of or impacts against the compact-disk player, audible interruptions in the music or speech are the consequence. Another drawback is that a relatively expensive program is necessary to deflect the beam of light back to the correct data-storage track by means of the subcode.

This means of correction, however, is not even available with unformatted optico-magnetic disks and DRAW-disks.

Japanese Exposure 60 10 429 discloses a tracking circuit wherein the positive or negative envelope of the high-frequency signal indicates whether the beam of light is traveling over data-storage tracks. Since however, only the high-frequency interventions are counted by a counter, there is no way of determining what direction the beam of light is moving in, whether in toward the center of the disk or out toward its edge. The counter counts only the high-frequency interventions and accordingly the number of data-storage tracks traveled.

When mechanical impacts or vibrations occur, however, the eccentricity of the disk can result in errors in counting the data-storage tracks traveled. When for example the pick-up is displaced outward by an impact and when the data-storage tracks below the pick-up simultaneously also move outward more rapidly than the pick-up as the result of the eccentricity, the pick-up will actually be moving inward in relation to the data-storage tracks. Since the counter will count the same data-storage tracks several times in such a situation, a much wider deviation from the correct data-storage track will be indicated than is actually the case. The correct data-storage track can accordingly no longer be located without additional corrective measures.

SUMMARY OF THE INVENTION

The object of the invention is accordingly to improve a tracking circuit for an optical pick-up to the extent that the beam of light that scans the data-storage tracks will be rapidly and reliably deflected back to the data-storage track being scanned once it has been jolted away from the track by a mechanical impact for example.

This object is attained in accordance with the invention in that a directional logic circuit determines which direction a scanning beam of light has been jolted away from the data-storage track being scanned in, in that an up-and-down counter counts the number of data-storage tracks the beam of light skips when it is jolted away from the data-storage track being scanned, and in that a control signal is obtained from the state of the counter in order to deflect the beam of light back to the data-storage track being scanned.

DESCRIPTION OF THE PREFERRED EMBODIMENTS

Figure 1A:
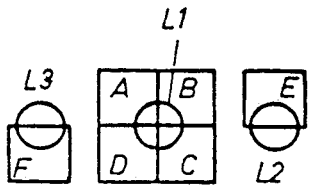
FIG. 1a is a schematic view of the photodetector arrangement when both focusing and tracking are precise.
Figure 1B:
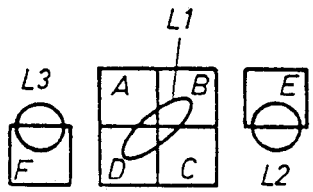
FIG. 1b is a schematic view of the photodetector arrangement in an out-of-focus situation in which the objective lens is too far from the compact disk.
Figure 1C:
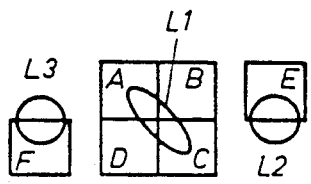
FIG. 1c is a schematic view of the photodetector arrangement of another out-of-focus situation in which the objective lens is too near the compact disk.
Figure 1D:
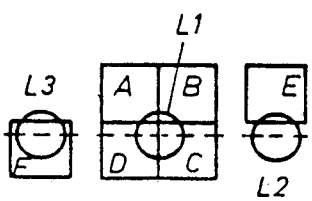
FIG. 1d is a schematic view of the photodetector arrangement in which the laser beams are to the right of the track.
Figure 1E:
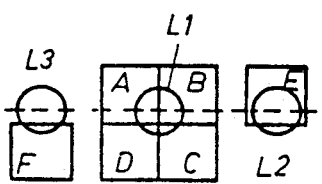
FIG. 1e is a schematic view of the photodetector arrangement in which the laser beams are to the left of the track.
Figure 2:
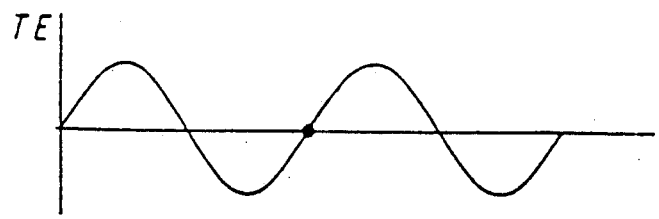
FIG. 2 illustrates the sinusoidal tracking error TE.
Figure 3:
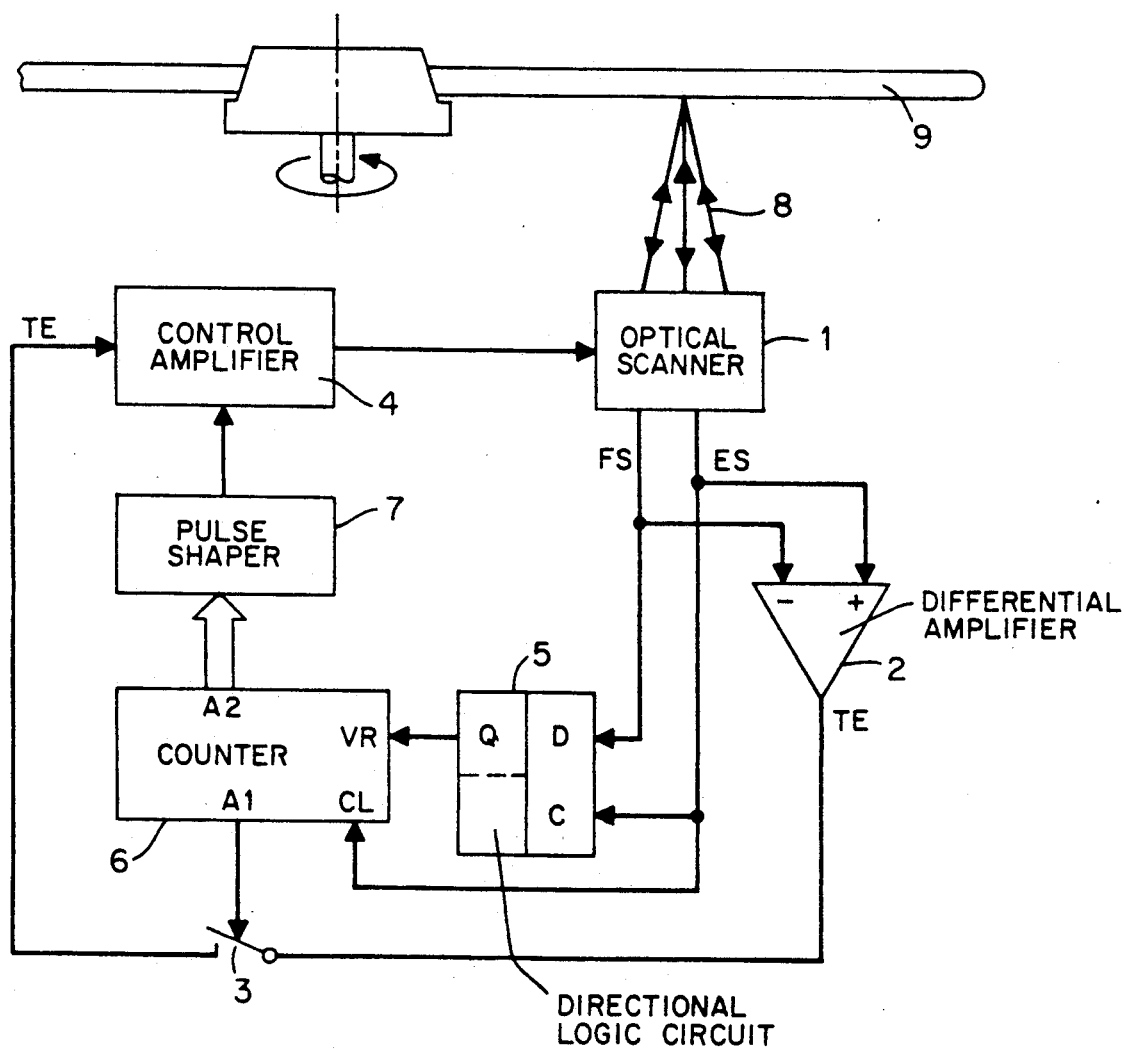
FIG. 3 illustrates one embodiment of the invention.

The embodiment of the invention illustrated in FIG. 3 will now be specified.

A tracking error TE=ES−FS is obtained in a differential amplifier 2 from the two photovoltages ES and FS arriving from an optical pick-up 1. Tracking error TE is forwarded by way of a controllable switch 3 to the input terminal of a control amplifier 4 in the tracking circuit. The output terminal of the control amplifier is connected to the input terminal of the positioning mechanism in the tracking circuit. Photovoltages ES and FS are also forwarded to a directional logic circuit 5. One output terminal A1 of up-and-down counter 6 is connected to the control input terminal of controllable switch 3. The output terminals A2 of up-and-down counter 6 from which the state of the counter and the mathematical sign can be obtained are connected to the input terminal of a pulse former 7, the output terminal of which is connected to control amplifier 4.

Directional logic circuit 5 can be a D flip-flop, at the D input terminal of which a photovoltage FS for example is present and at the clock input terminal of which the other photovoltage ES is present. The Q output terminal of the D flip-flop is connected to the up-and-down counting input terminal VR of up-and-down counter 6. Since the clock input terminal of the D flip-flop is connected to the clock input terminal CL of up-and-down counter 6, both the D flip-flop and up-and-down counter 6 are synchronized by one photovoltage, other photovoltage ES in the present example. The phase shift between the photovoltages ES and FS that the tracking error TE is obtained from the difference between in this embodiment is approximately 90°.

As soon as scanning beam of light 8 is jolted away from the data-storage track on the optical recorded medium, a compact disk 9 for example, that is being scanned, up-and-down counter 6 receives a positive or negative counting pulse from the D flip-flop in directional logic circuit 5 depending on what direction the beam of light has be diverted in. If for example the beam of light has been jolted toward the center of the disk, the clock input terminal of the D flip-flop and of up-and-down counter 6 will initially receive a clocking pulse. Since, however, there is a logical zero at the D input terminal of the D flip-flop, its Q output terminal will remain at LOW, and up-and-down counter 6 will count down. In the opposite situation, when the beam of light has been jolted radially outward toward the edge of the disk from the data-storage track, first the D input terminal of the D flip-flop and then its clock input terminal and that of up-and-down counter 6 will receive a pulse. Since up-and-down counter 6 now receives a clock input terminal due to the setting of the D flip-flop, the Q output terminal of which is at HIGH, the up-and-down counter will now count up.

The first counting pulse, whether positive or negative, will make the state of the counter either +1 or −1. Controllable switch 3 will open with the counter at this state and the control signal will be disconnected. Since up-and-down counter 6 receives a positive or negative counting pulse every time the beam of light crosses a data-storage track, the state of the counter is proportional to the deviation of beam of light 8 from the data-storage track being scanned. Pulse former 7 accordingly obtains a correction signal from the state of the counter and forwards it to control amplifier 4, which then rapidly and precisely deflects the beam back to the data-storage track being scanned. During this process the state of the counter returns to zero because up-and-down counter 6 is constantly counting along. When the state of the counter is zero, controllable switch 3 closes again along with the control signal because beam of light 8 is now scanning the correct data-storage track again.

When, as in the case of most compact-disk players, which operate on the three-beam principle, the phase shift between photovoltages ES and FS is 180°, the envelope of data signal HF is to be supplied to the clock input terminal of the D flip-flop instead of one photovoltage and the tracking error TE to its D input terminal instead of the other photovoltage in order to make two voltages that are phase shifted 90° available.

Figure 4:
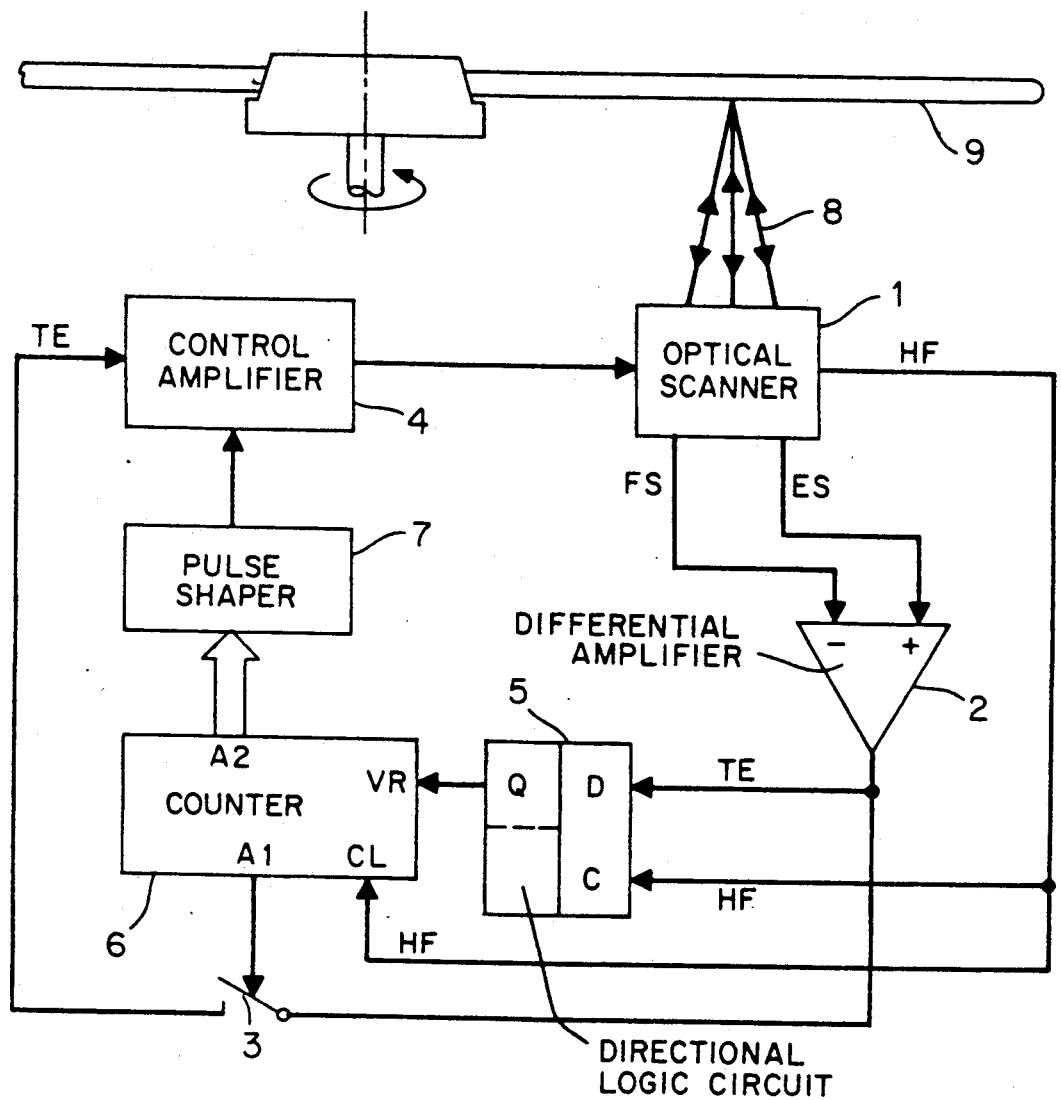
FIG. 4 illustrates another embodiment of the invention.

The clock input terminal of the D flip-flop in the embodiment illustrated in FIG. 4 is accordingly connected to whichever output terminal of optical pick-up 1 the envelope of data signal HF obtained as described initially with reference to FIG. 1 from the sum of the four photovoltages AS, BS, CS, and DS of the four photodiodes A, B, C, and D can be obtained from. The D input terminal of the D flip-flop is connected to the output terminal of differential amplifier 2.

The embodiment illustrated in FIG. 4 operates like the embodiment illustrated in FIG. 3. Every time the beam of light travels from one data-storage track to the next, there is a high-frequency intervention in the data signal. The D flip-flop accordingly constantly receives a paisleys at its clock input terminal when the beam of light crosses a data-storage track. Since, however, the mathematical sign of tracking error TE depends on the direction that the beam leaves the track in, the D flip-flop will be set with its output terminal at HIGH in relation to one direction and at LOW in relation to the other direction. Up-and-down counter 6 will accordingly count up in relation to one direction and down in relation to the other.

The connections to the input terminals of D flip-flop 5 can also be reversed, with the envelope of data signal HF at its D input terminal and tracking error TE at its clock input terminal.

The invention is appropriate for compact-disk players, DRAW-disk players, videodisk players, and optico-magnetic equipment.

What is claimed is:

1. A tracking circuit for an optical scanner scanning a recorder medium having data tracks arranged adjacent to each other, comprising: an optical scanner for directing a scanning beam of light at said data tracks and receiving reflected light from said data tracks, said optical scanner having two photovoltage outputs; difference means connected to said two photovoltage outputs for taking the difference between said two photovoltage outputs to generate a tracking error signal at an output of said difference means; a directional logic circuit having two inputs connected to said two photovoltage outputs of said optical scanner, said beam of light being deflectable through external effects by an undesired deflection away from a track being scanned by said beam of light and said beam of light being deflectable to other tracks during said undesired deflection, said directional logic circuit determining the direction in which said light beam is deflected during said undesired deflection; an up-and-down counter connected to an output of said directional logic for counting said other tracks; said counter emitting a control signal dependent on the number of said other tracks for deflecting said beam of light back to the data storage track that was being scanned, said tracking error signal being dependent both on the amount of said undesired deflection and the direction of said undesired deflection; controllable switch means connected between said difference means and said optical scanner for transmitting said tracking error signal to said optical scanner; said switch means being operated by said counter for opening said switch means when said light beam is deflected from the track being scanned and reclosing said switch means after said light beam has been returned to the track being scanned; said counter counting up or down dependent on direction of deflection of said beam of light, said counter returning to a zero state only after said light beam has been completely returned to the track being scanned.

2. A tracking circuit as defined in claim 1, wherein said difference means for generating said tracking error signal comprises a differential amplifier, said two photovoltage outputs being connected to said differential amplifier and to said directional logic circuit, said differential amplifier having an output; said controllable switch means being connected to said output of said differential amplifier, said controllable switch means having a control input connected to an output of said counter; a control amplifier with input connected to said controllable switch means; light beam positioning means in said optical scanner and connected to an output of said control amplifier; said directional logic circuit having an output connected to an input of said counter, said counter having an output for said control signal, said output of said counter being indicative of a state of the counter and mathematical sign of the state; pulse shaping means having an input connected to the output of said counter, said pulse shaper having an output connected to said control amplifier.

3. A tracking circuit as defined in claim 1, wherein said optical scanner generates a data signal supplied to said directional logical circuit; said difference means for generating said tracking error signal comprising a differential amplifier having an output; said controllable switch means being connected to the output of said differential amplifier and having a control input connected to an output of said counter; a control amplifier having an input connected to the output of said differential amplifier through said controllable switch means; positioning means in said optical scanner connected to an output of said control amplifier, said output of said directional logical circuit being connected to a counting input of said counter, said counter having an output indicative of a counter state and mathematical sign associated with that state; pulse shaping means having an input connected to said output of said counter, said pulse shaping means having an output connected to said control amplifier.

4. A tracking circuit as defined in claim 3, wherein said directional logic circuit comprises a D flip-flop having a D input, said data signal having an envelope, said D input being supplied with the envelope of said data signal or said tracking error signal, said directional logical circuit having a clock input supplied with said tracking error signal or the envelope of said data signal; said flip-flop having a Q output connected to a counting input of said counter; said flip-flop having a clock input connected to a clock input of said counter.

5. A tracking circuit as defined in claim 2, wherein said directional logic circuit comprises a D flip-flop having a D input connected to one of said photovoltage outputs, said flip-flop having also a clock input connected to the other one of said photovoltages, said flip-flop having a Q output connected to an input of said counter, said counter having a clock input connected to said clock input of said flip-flop.

* * * * *